Patented Dec. 8, 1942

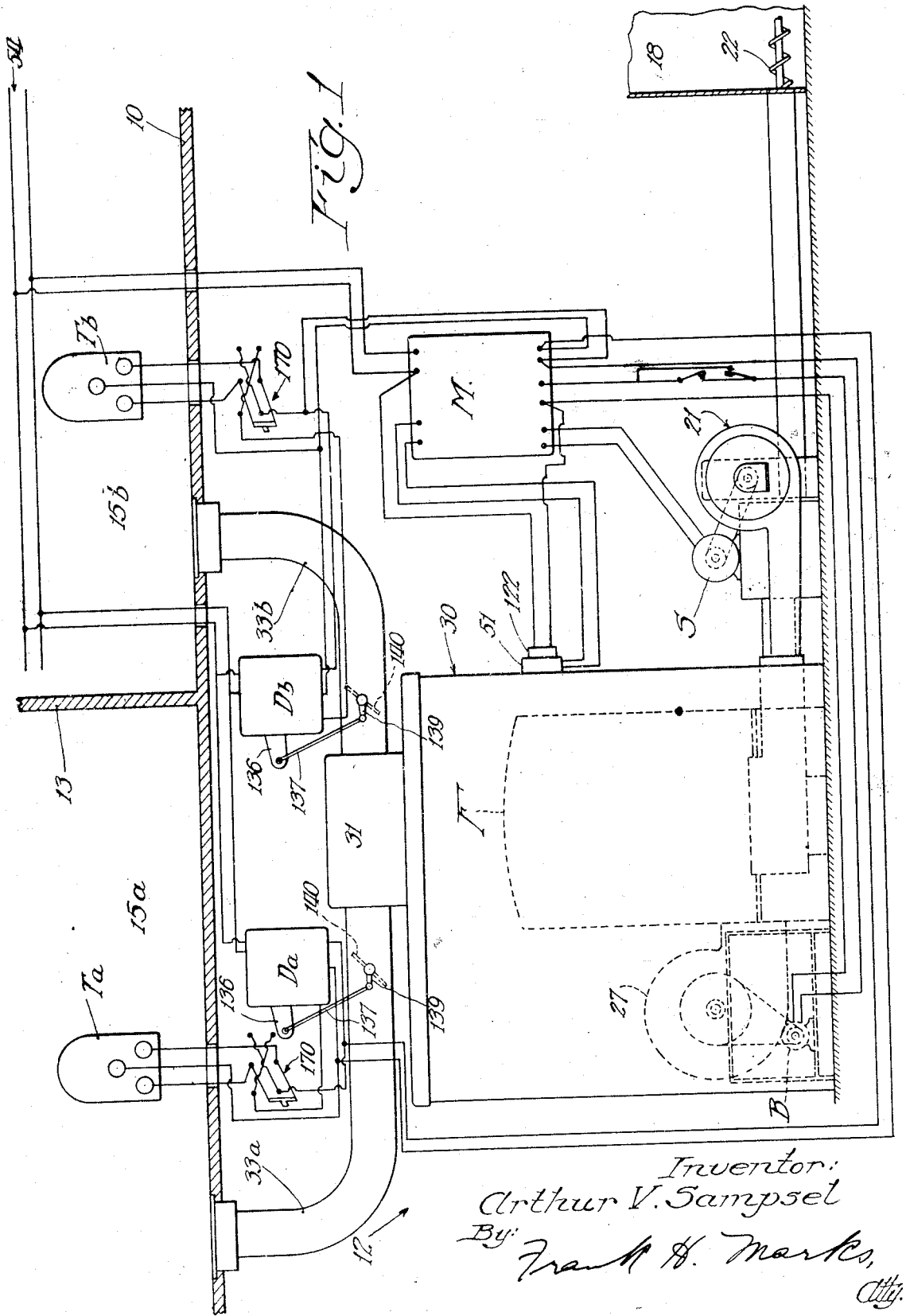

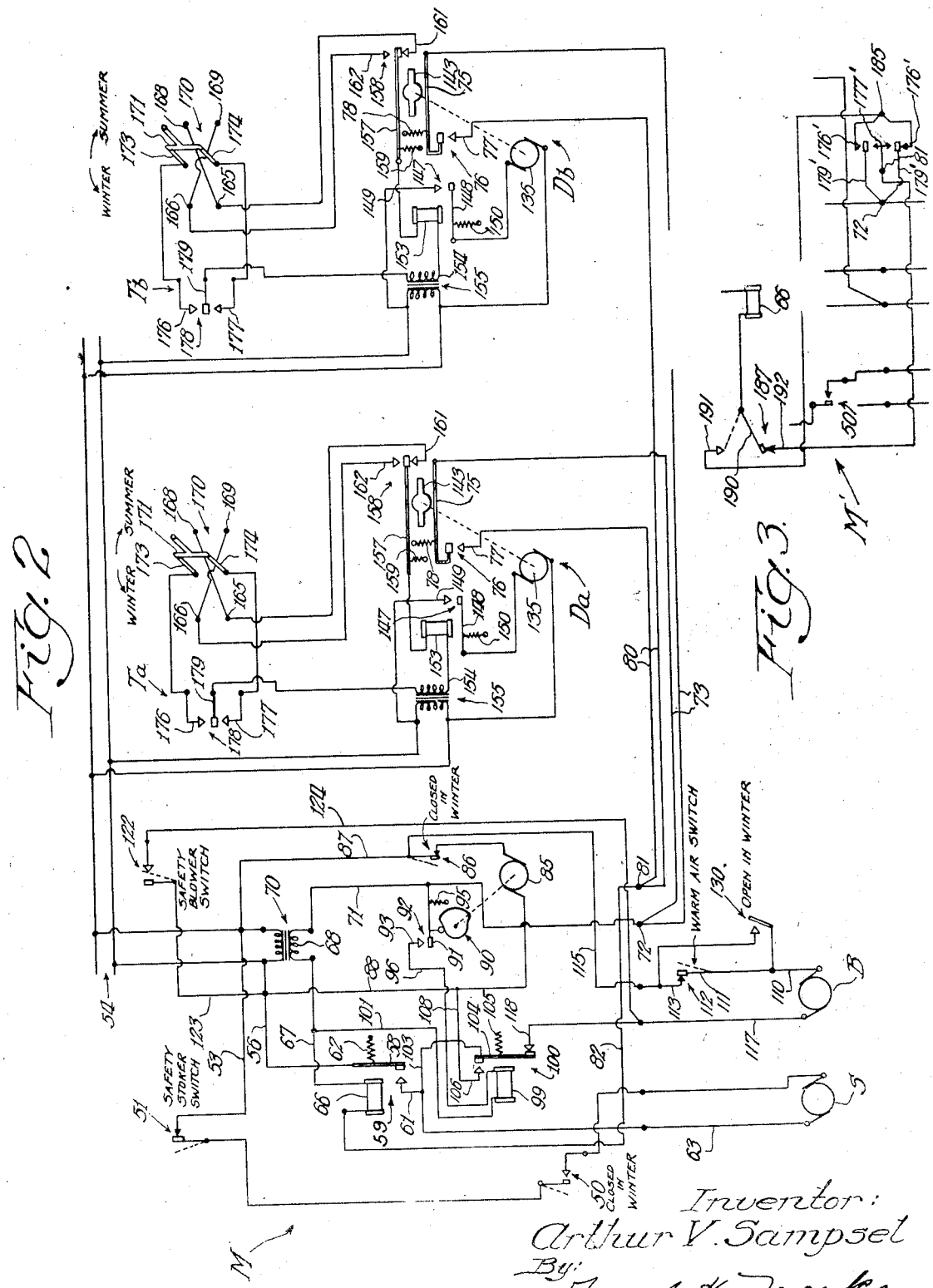

2,304,124

UNITED STATES PATENT OFFICE 2,304,124

HEATING AND COOLING APPARATUS

Arthur V. Sampsel, Mendota, Ill., assignor to Sears, Roebuck and Co., Chicago, Ill., a corporation of New York Application February 4, 1938, Serial No. 188,639

2 Claims. (Cl. 236—11)

My invention relates to heat control devices and has to do more particularly with the heating and cooling of one or a plurality of rooms or zones. It will be found applicable to systems employing air, water or other heat exchange medium.

It is an object of my invention to provide mechanism for controlling the air conditioning of a plurality of zones automatically in such manner that each zone controls its own conditioning independently of the other zone or zones.

It is another object to provide mechanism for controlling the air temperature of a plurality of zones automatically in such manner that each zone controls its own temperature independently of the other zone or zones.

It is a further object to provide a system operative in winter to heat and in summer to cool each of a plurality of zones automatically independently of the other zone or zones.

Another object is to provide a conditioning system in which the supply of heat exchange medium and the operation of valving means therefor are both governed by the same thermostat.

A further object is to provide a conditioning system for a plurality of zones, wherein a damper or the like associated with each zone and a supply of heat exchange medium are both controlled by the thermostat associated with said zone, so that said medium may be supplied to each zone independently of the other zone or zones.

It is also an object to provide for automatically stopping fuel feed to a furnace and at substantially the same time automatically commencing the cooling of the furnace.

Also an object of the invention is the automatic cooling of the furnace when it is excessively heated.

A still further object resides in the provision of a master control with a winter relay which normally completes a circuit to supply a heat transfer medium when demanded by a thermostat and in the winter is automatically operative by a fire control to open that circuit and close a fuel feed circuit regardless of whether or not the thermostat is demanding heat.

Further objects and advantages of my invention will appear as the description proceeds.

The invention will be understood upon reference to the following description and the accompanying drawings, in which:

Fig. 1 is a fragmentary vertical sectional diagrammatic view through a building in which is installed a damper-responsive control system embodying features of my invention.

Fig. 2 is a detailed wiring diagram of the system appearing in Fig. 1.

Fig. 3 is a fragmentary diagrammatic view showing how a portion of the wiring of Fig. 2 may be modified to adapt the system to an installation which is not damper-controlled, as well as to one which is damper-controlled.

In the drawings, the numeral 10 represents a floor of a building, separating the basement 12 from the living or other quarters, which may be divided by walls such as the wall 13 into enclosures or zones 15a and 15b.

In the basement 12 there is provided a coal bin 18 and a furnace F, which may be of the hot air type, as shown, and adapted for coal burning. An underfed stoker 21 comprising a screw conveyor 22 extends from the bin to the furnace. A suitable motive means S is provided for operating the conveyor for feeding coal from the bin to the furnace, and a blower or fan 27 is also provided, operated by a motor B.

For illustrative purposes only, I have elected to show and describe a furnace of the hot air type, surrounded by a casing or bonnet 30 communicating through a plenum chamber 31 with air flues or ducts 33a and 33b, whereby warm air in the winter and cool air in the summer, when the furnace is not used, is conveyed to the respective zones or rooms whose temperatures are to be controlled.

Each zone has a thermostat Ta, Tb, controlling a damper-control mechanism Da, Db, which in turn operates, in addition to a damper or valve for controlling flow of heat exchange medium to the respective zones, a switch controlling the stoker motor S and the blower or pump motor B through connections and apparatus which may be suitably mounted on a master panel as indicated generally at M. The panel apparatus appears in detail diagrammatically in Fig. 2 and elsewhere.

The winter operation of the apparatus of my invention is substantially as follows: When any zone thermostat calls for heat, the appropriate damper will be opened and cause the stoker S and the blower B to be placed in operation. If thereafter, and before said thermostat has demanded a shutoff, a thermostat in another zone calls for heat, the appropriate damper for such other zone will be opened. However, since the stoker and blower are already in operation no alteration in the performance of these elements will occur. This procedure, of course, will be the same for any number of zones, the demand for heat in any additional zone resulting merely in the opening of the appropriate damper while the stoker and blower continue to operate, so long as at least one thermostat calls for heat. As long as at least one thermostat demands heat, the electrical circuits controlling the stoker and blower will be closed and, therefore, the demand by any other thermostat that heat be shut off will result merely in the closing of the damper corresponding to such other thermostat without affecting the stoker or blower. In other words, under normal conditions, the stoker and blower will not shut down until all of the thermostats have ordered a discontinuance of heat.

A time fire pilot control is provided to operate the stoker at suitable intervals in mild winter weather to keep the fire from going out.

The above zone and time controls are subject to the following exception, however. In the event that the furnace becomes heated above a predetermined temperature, the electric circuit controlling the stoker will open and will remain open at least as long as said temperature is exceeded. While the stoker is thus shut down, the furnace temperature may increase, due to residual heat or heat from a banked fire, for example. In compliance with ordinances, municipal codes, underwriters' requirements and the like, provision may be made for the automatic operation of the blower when a predetermined higher furnace temperature obtains, and until the furnace is cooled to a prescribed temperature usually between said predetermined temperatures when the medium is hot air. In the event any zone calls for heat while the furnace temperature is above the predetermined stoker cutoff temperature and below said prescribed blower cutoff temperature, the blower will operate to supply the demand, notwithstanding that the stoker is not in operation. When the furnace is again at or below the stoker cutoff temperature, the stoker and blower are controlled as set forth above.

To convert the apparatus to summer operation it is necessary merely to throw a few switches, the effect of which is to shut off the stoker and enable dampers to operate the blower to supply cool basement or other air to the individual zones as required by the respective zone thermostats. By throwing the same switches again, the apparatus is prepared for winter operation.

By a simple expedient, which will appear, the apparatus on the master panel may be adapted for operation with or without damper control, as desired.

Throughout this specification, unless otherwise specified or as may be gathered otherwise from the context, "winter" is to be considered as including the late fall and early spring, and "summer" as including the late spring and early fall, it being understood that these periods are variable in duration according to locality and the particular weather conditions prevailing.

The stoker S is operated when heat is called for by any zone or room thermostat, and independently of the zones by a clock, as long as the furnace is not excessively hot.

The stoker circuit as it is influenced by the zones will be described first. The stoker S is in series with a hand or other suitable switch 50 which is closed in the winter and open in the summer, so that the stoker operates only in the winter. The switch 50 is in series with a safety or limit control thermostat switch 51 which is adapted to open and thereby stop the stoker when the furnace reaches a predetermined high temperature. A wire 53 connects the switch 51 to one side of the line 54 available for the particular installation. From the other side of the line a wire 56 is connected to the blade 58 of a single pole single throw relay 59, said blade being urged away from the relay contact 61 by a spring 62. The contact 61 is connected by a wire 63 to the stoker S, thereby completing the zone-controlled stoker circuit. With winter conditions prevailing, so that the switch 50 is closed, and with the safety switch 51 closed, i. e., when the furnace is not above a predetermined temperature, the operation of the stoker in this circuit is dependent on the closing of the switch of the relay 59.

The coil 66 of the relay 59 is connected by a wire 67 to the low voltage side 68 of a transformer 70 connected to the line 54. A wire 71 connects the other end of the transformer side 68 to a post 72, and a wire 73 extends from the post to the blade 75 of a switch 76 associated with each zone. Each switch 76 has a contact 77. The blade is urged by a spring 78 away from the associated contact 77. Each switch 76 is controlled by a room thermostat, as will be explained in detail. A wire 80 connects each contact 77 to a second post 81, and a wire 82 completes the relay circuit to the relay coil 66.

It is apparent that the switches 76 are connected in parallel, so that when at least one is closed, i. e., when any zone or room demands heat in the winter, the relay coil 66 is energized, causing the blades 58 to engage the contact 61 and thereby close the stoker circuit for operating the stoker, and, as will appear, the blower.

There is likely to be a period from time to time during which the stoker will not be called upon, as when mild winter weather prevails, and accordingly the fire in the furnace might die. I provide a fire control mechanism for such a contingency. To that end there is provided a synchronous clock 85 which is connected through a manual or other suitable switch 86, closed only in the winter, and a wire 87 to one side of the line 54, and by a wire 88 to the other side of the line. Cam mechanism indicated schematically at 90, hereinafter more specifically described, operated by the clock 85, periodically enables the blade 91 of a switch 92 to move into engagement with the contact 93 to close said switch, the blade being urged by a spring 95 away from the contact. A wire 96 connects the contact 93 to the coil 99 of a relay 100, and this coil is connected by a wire 101 to an end of the low voltage side 68 of the transformer 70, the other end being connected by the wire 71 to the blade 91, completing the clock-controlled relay circuit.

It will be observed that the wire 63, connected to the stoker S, is connected to another wire 102 which is connected to the blade 104 of the relay 100, said blade being urged by a spring 105 away from a contact 106 of said relay. A wire 108 connects the contact 106 to that side of the line to which the blade 58 of the zone thermostat-controlled relay 59 is connected. Thus the relay 59 is by-passed when the clock periodically energizes the other relay coil 99, drawing the blade 104 into engagement with the contact 106, completing the clock-controlled stoker circuit. The clock may operate the stoker any desired number of times per hour, for example, for any desired duration each time;—from, say, fifteen seconds, more or less, to, say, seven minutes, more or less.

The stoker will be operated when either or both of the relay coils 59 and 99 are energized, i. e., when either one or more zones and/or the clock calls for heat, provided of course the stoker safety switch 51 is closed.

The blower B is operative in the winter to deliver warm air and in the summer to deliver cool air. It may be connected by a wire 110 to the blade 111 of a limit control switch 112 which is preferably of the thermostat type and is adjusted to open when the temperature of the air in the furnace bonnet is too cool for introduction to a room or zone to which warm air is to be delivered by the blower. The contact 113, engageable by the blade 111 when the bonnet air is warm, is connected by a wire 115 to a side of the line 54. A second wire 117 is extended from the blower B and is connected to a contact 118 on the relay 100. The relay blade 104 is urged by the spring 105 into engagement with the contact 118, completing a blower circuit through the wire 103, relay switch contact 61 and associated blade 58, and wire 56 to the other side of the line 54.

It has been seen that the zone-controlled relay 59 may operate to run the stoker S. It is now apparent that said relay at the same time may cause operation of the blower B, provided that the air in the furnace bonnet is sufficiently warm to close the air limit switch 112 and further that the clock does not cause the relay 100 to withdraw the blade 104 from the contact 118. Tests have shown that periodic stopping of the blower by the clock has a negligible effect on the temperature of the zones. It will be appreciated that even while the blower is idle the warm air will pass such dampers as may be open and into the heat-demanding zones by natural draft.

It has been pointed out that the switch 51 will be open and stop the stoker at a predetermined furnace or bonnet temperature. The heat from the fuel in the furnace may raise the temperature of the furnace substantially above that at which the switch 51 opens. The furnace nevertheless may have a safe operating temperature range above said predetermined temperature. To prevent overheating, I provide a blower limit or emergency switch 122 which is normally open but is designed to close at the upper limit of said range and to maintain the blower in operation regardless of lack of zone demand and of the clock, until the furnace is cooled to a temperature preferably intermediate the limits of said range, whereupon the switch 122 may open. Zone operation of the blower is not affected by the switch 122, but only by the clock. The switch 122 is connected by a wire 123 to the line 54 and by a wire 124 to the wire 117, thereby by-passing the relay switches containing the blades 58 and 104, respectively, and closing a circuit controlling the blower. In a short time, say about one minute, more or less, the blower will discharge sufficient air to effect the desired amount of cooling and thereby open the switch 122. In the event the dampers are closed during such emergency operation of the blower, the air thus blown will pass by way of the usual clearance between the dampers and the duct walls. Or, such air may discharge through a back pressure by-pass (not shown) to the outside of the bonnet.

In a hot air installation a temperature range or differential of about 100° F. has been found satisfactory, although it is to be understood that the switches 51 and 122 may be adjusted or formed to operate at any temperatures desired or required. For example, the switch 51 may open at a bonnet temperature of 300° F. and the auxiliary switch 122 may close at 400° F. and open at 375° F. When hot water is used, it is desirable to operate the switches 51 and 122 at the same time, a pump being of course used in lieu of a blower. When steam is used, emergency means such as a blow-off valve may be employed so that the switch 122 may be dispensed with.

The operation of the stoker below the stoker cutoff temperature and of the blower below the blower cutoff temperature is dependent on the controls already described.

In the summer it is desirable to operate the blower to furnish cool, basement or other air from the bonnet to the various zones, the furnace being of course unheated. Since the low limit air control switch 112 for the blower will be open at such time, I provide a manual or other suitable switch 130 which is maintained open in the winter, so as not to overcome the effect of the opening of the switch 112, but is closed in the summer. At such time the blower limit switch 122 is of course open and the clock idle. The clock switch 92 should be open so that the blade 104 will be engaged with the contact 118. If, when the clock switch 86 is opened for summer operation of the apparatus, the switch 92 happens to be closed, the cam mechanism 90 may be adjusted to open said switch, as will appear. The blower circuit is therefore open and closed only when any one or more of the zone thermostat-controlled switches 76 closes, as has been pointed out.

The switch 112 may be closed all of the time, if desired, or may be omitted and the wire 110 directly connected with the wire 115, when hot air is the heat exchange medium. When hot water or steam is the medium, the switch 112 is not needed, so that said wires may be directly connected. In any such event it is apparent that the switch 130 would not be needed.

I provide a simple yet unique control for the damper and switch 76 associated with each zone. This control includes a damper motor 135 operatively connected, through any suitable means, such as reduction gearing (not shown), with a crank arm 136 (Fig. 1) from which a connecting rod 137 extends to a crank arm 139 on a damper valve 140, the arrangement being such that in one stroke of the arm 136 the valve will open fully and in the return stroke the valve will close fully. The damper motor 135 turns a cam 143 adapted to close the switch 76 by moving the blade 75 against the action of the spring 78 and into engagement with the contact 77, and also adapted to start and stop the motor, as will appear.

The damper motor 135 is connected to the line 54 and is controlled by a switch 147 having a blade 148 urged away from the contact 149 by a spring 150. This blade is adapted to be moved into engagement with the contact 149 when a relay coil 153 is energized. This coil is connected to the low voltage side 154 of a transformer 155, fed by the line 54. The coil 153 is connected to the blade 157 of a single pole double throw switch 158, a spring 159 urging the blade into engagement with a contact 161 and the cam 143 being operative when moving the blade 75 of the switch 76 to also move the blade 157, against the action of the spring 159, into engagement with the contact 162. These contacts lead respectively to winter poles 165 and 166 at one side, and to summer poles 168 and 169 at the other side, of a double pole double throw switch 170, said switch comprising an arm 171 having blades 173 and 174 engageable with the first pair of poles 166 and 165 in the winter and with the second pair of poles 168 and 169 in the summer. The switch blades 173 and 174 are connected respectively with the contacts 176 and 177 of a single pole double throw thermostat 178, the movable blade 179 of which is connected to the low voltage side 154 of the transformer 155, completing various circuits including the relay coil 153. The blade 179 is adapted to engage the contact 176 when heat is not demanded in the winter and when cooling is demanded in the summer, and to engage the contact 177 when heat is demanded in the winter and when cooling is not demanded in the summer.

The operation of the damper control will now be described, first for winter conditions and then for summer conditions.

In the winter, the blades 173 and 174 are engaged with the poles 166 and 165, respectively. Let it be assumed that the zone under consideration is not demanding heat. At such time the thermostat blade 179 is engaged with the contact 176, and the damper is closed, the cam 143 being in its inoperative position so that the switch 76 is held open by the spring 78 and the blade 157 is engaged with the contact 161. The cam should not be turning under such conditions because if it were it would cause the switch 76 to close and cause the stoker and blower to operate when heat is not wanted in the zone. It will presently appear that with the circuit arrangement referred to the cam under such conditions remains in an inoperative position.

Under the conditions just stated, in order for the cam 143 to be idle, the switch 147, controlling the damper motor 135, which runs the cam, must be open and hence the relay coil 153, controlling the switch 147, must not be energized. This coil is in a circuit which includes the blade 157 and contact 161, contact 165, blade 174 and thermostat contact 177, but since the contact 177 is not engaged with the blade 179, the coil circuit is open, so that the switch 147 is open and hence the damper motor 135 and cam 143 are idle.

Now let it be assumed that the zone requires heat. The thermostat blade will snap into engagement with the contact 177, so that, following through the relay coil circuit from that point in the next previous paragraph, the circuit continues from the contact 177 through the blade 179 and low voltage side 154 of the transformer 155 back to the coil 153 and hence the circuit is closed. The coil accordingly closes the switch 147, starting the damper motor 135 and cam 143. The damper motor opens the damper while the cam closes the switch 76 and disengages the blade 157 from the contact 161. As will be seen, this disengagement opens the relay coil circuit and hence the damper motor switch 147 opens, stopping the damper motor. The parts are so arranged that this disengagement occurs just at or after the closing of the switch 76, so that the opening of the damper will be completed and the cam will stop at a position where it maintains the switch 76 closed against the action of the spring 78 and maintains the blade 157 in engagement with the contact 162 against the action of the spring 159.

With the thermostat blade 179 engaged with the contact 177 and the blade 157 engaged with the contact 162, the relay coil circuit extends from the coil 153 through the blade 157, contact 162, contact 166, blade 173 to thermostat contact 176 which is free of the thermostat blade 179, so that the relay coil circuit is open, Q. E. D.

The switch 76 being now closed, the stoker control relay coil 68 is energized and the relay switch blade 58 moved into engagement with the contact 61, starting the stoker S. The warm air limit switch 112 will be closed if the air in the bonnet is sufficiently warm, as it is likely to be. In any event, the furnace will heat the air quickly, so that this switch will close in a minute or two and thus operate the blower.

As has been pointed out, under normal conditions, when the pilot fire control, i. e., the clock, operates the stoker S, the blower does not operate, and this condition is naturally desirable when no heat is needed. If the zone at such time should be demanding heat its damper will be open so that there will be some delivery of warm air by natural draft. In cold weather the clock adjustment is preferably such as to operate the stoker sparingly inasmuch as the zones will make adequate demands on the stoker to keep the fire from dying. Consequently the stoppages of the blower by the clock will be of such short duration as to not appreciably affect the comfort in the zones. When the weather is relatively mild the clock adjustment preferably will be such as to operate the stoker more often or for longer periods because of the corresponding paucity of the zone demand for stoker operation, and at such times it is accordingly desirable that the blower be idle, the dampers being closed.

The delivery of warm air will be continued until the switch 76 opens, and, as will be explained, this will occur when the thermostat 178 stops calling for heat, for then the thermostat blade 179 will separate from the contact 177 and become engaged with the contact 176.

It will be recalled that the damper motor 135 and cam 143 stopped with the switch 147 open, the damper open and the cam holding the switch 76 closed and the blade 157 free of the contact 161 and in engagement with the contact 162, and because the thermostat blade 179 was separated from the contact 176, the circuit of the relay coil 153 was open. Now, however, that the thermostat blade 179 has become engaged with the contact 176, the circuit of the relay coil 153 is closed since it runs from said coil through the blade 157, contact 162, contact 166, blade 173, thermostat contact 176, thermostat blade 179, low voltage side 154 of the transformer 155 and back to the coil 153. Accordingly, when the thermostat blade 179 engages the contact 176 the coil 153 is energized, closing the damper motor switch 147 against the action of the spring 150, starting the damper motor 135 and cam 143. The cam turns, allowing the spring 78 to open the switch 76 and thereafter the spring 159 to withdraw the blade 157 from the contact 162, thereby opening the coil circuit so as to deenergize the coil 153 and allow the spring 150 to open the damper motor switch 147. When the damper motor stops, the damper is closed and the cam is in inoperative position, and since the switch 76 is now open, the stoker control relay coil 68 is deenergized and the relay switch 58 is open, so that the stoker and blower are both stopped. Now the conditions are the same as at the beginning of the cycle of operation just explained.

Thus it is clear that in the winter heat will be supplied to any zone demanding it, regardless whether any other zone is demanding it, and that heat will not be supplied to any zone not demanding it; that provision is made against the delivery of air unless it is of the desired minimum temperature; that the fire will not go out even though heat may not be demanded for a long period; that the stoker will stop when the furnace temperature exceeds a predetermined high temperature, the furnace being allowed to be heated by the fuel therein to a higher temperature limit, as when hot air is the heat exchange medium; that at such upper limit the blower will be turned regardless of lack of zone demand for heat, to preclude overheating of the furnace and will cool the furnace to a safe temperature before being turned off; that the blower will supply heat substantially whenever demanded, and the clock cannot operate the stoker nor prevent operation of the blower while the furnace is within a predetermined temperature range. When hot water is the medium, emergency cooling of the furnace starts immediately upon stopping of the stoker at a predetermined high temperature. When steam is the medium, emergency operation of a blow-off valve will take care of the situation.

In the summer, the switch 30, controlling the stoker S, is thrown and maintained open, so that the stoker and hence the furnace are not in operation. The stoker limit switch 51 is closed but of course ineffectual, and the blower limit switch 122 is open. The clock switch 86 is open so that the clock is stopped. The switch 130, however, is closed, and since it is in parallel with the air limit switch 112, it is immaterial whether the latter is open or closed. Now it will be observed that there is a blower circuit extending from the blower through the switch 130 to one side of the line 54, from the other side of the line to the relay switch blade 58, associated contact 61, wire 103, blade 104, held engaged with contact 118 by spring 105, and wire 117 back to the blower. Thus the closing of this circuit is dependent upon the positions of the blades 58 and 104. The blade 104 is moved from the contact 118 when the coil 99 is energized. To preclude such energization the clock-operated cam mechanism 90 is adjusted when the clock is stopped, so as to open the switch 92 controlling said coil. Accordingly in the summer the blower circuit is dependent on only the switch blade 58, which is controlled by the relay coil 66 which is controlled by any zone switch 76. This switch is closed when the zone associated therewith needs cooling and is open when cooling is not demanded, as will appear.

Upon the arrival of summer the stoker and blower will not be called upon at all for the supply of heat. When there is no demand for heat, it has been seen that the thermostat blade 179 is engaged with the contact 176, the damper motor 135 is stopped with the damper closed, and the switch 147 accordingly open and the cam 143 in inoperative position so that the switch 76 is open and the blade 157 engaged with the contact 161, winter-summer switch handle 171 being of course in its winter position with its blades 173 and 174 respectively engaged with the contacts 166 and 165.

With this arrangement prevailing, no closing of the switch 76 can occur unless heat is demanded. It is desirable to furnish the zones with cool air during the summer, and that is made possible by the system I have provided, merely by throwing the switch handle 171 to its summer position, when the blades 173 and 174 respectively engage the poles 168 and 169. For the purpose of explaining a cycle of summer operation, let it be assumed that, when the switch handle 171 is thrown as just noted, the zones are comfortably cool so that none is demanding to be cooled. As the operation of all zones is the same, it will suffice if reference is made to but one zone.

It has been pointed out that in the summer the thermostat blade 179 is engaged with the contact 176 when cooling is demanded and with the contact 177 when cooling is not demanded. With the blade 179 engaged with the contact 177, the circuit of the relay coil 153 extends from one side of said coil through the blade 157, contact 161, pole 165, pole 168 and blade 173 to contact 176, which is free, so that the circuit is open and hence the coil is not energized, the switch 147 is open, the damper motor 135 and cam 143 are idle, the damper remains closed, the blade 157 continues engaged with the contact 161 and the switch 76 remains open so that the blower B is not in operation.

When the zone demands cooling, the thermostat blade 179 leaves the contact 177 and engages the contact 176, so that the above-referred to relay circuit continues from the contact 176, through the blade 179, low voltage side 154 of the transformer 155 and back through the coil 153, closing its circuit. The coil thus energized closes the damper motor switch 147 against the action of the spring 158, closing the damper motor circuit so that said motor and the cam 143 commence turning, the motor opening the damper and the cam operating to close the switch 76 and then to separate the blade 157 from the contact 161, breaking the circuit of the relay coil 153, allowing the spring 158 to open the damper motor switch 147, stopping the motor with the switch 76 closed and the blade 157 engaged with the contact 162. Closing of the switch 76 closes the circuit of the relay coil 66 which, thus energized, draws the blade 58 into engagement with the contact 61, closing the blower circuit. The blower B operates, supplying the cool air in the bonnet to the zone.

When the zone has cooled sufficiently, the thermostat blade 179 leaves the contact 176 and engages the contact 177. Then the circuit of the relay coil 153 is closed, the current flowing from the coil through the blade 157, contact 162, pole 166, pole 169, blade 174, thermostat contact 177, thermostat blade 179, low voltage side 154 of the transformer 155, back to the coil 153. Thereupon the coil 153 is energized, closing the damper motor switch 147 against the action of the spring 158, starting the damper motor 135 and cam 143, the motor turning the damper toward closed position and the cam allowing the spring 78 to open the switch 76, stopping the blower B, and allowing the spring 159 to move the blade 157 away from the contact 162, thereby deenergizing the coil 153 so as to permit the spring 158 to open the switch 147, stopping the motor 135 with the damper closed and the cam in inoperative position. This completes the cycle of summer operation, and it will be observed that the blower will operate and deliver cool air as long as any one or more zones demand it, and only to the zone or zones demanding it.

When winter comes, the switch handle 171 is moved to its winter position, where its blades 173 and 174 respectively engage the poles 166 and 165, the stoker controlling switch 50 is closed, the clock controlling switch 86 is closed and the switch 130 is opened. The winter cycle has already been explained.

It will be appreciated that if the heating medium be water or any other substance the member B could be a pump and there would be a water jacket, for example, instead of a bonnet, pipes instead of ducts, and radiators or unit heaters in the respective zones, as will be appreciated by those skilled in the art.

In Fig. 3 I have shown at M' a unit like the unit M but having an additional binding post 185 and a single pole double throw switch 187 whose blade 190 is operative through contacts 191 and 192 to connect the posts 81 and 185 alternatively to the relay coil 66. The unit M, above described in detail, employing only the posts 72 and 81, is used when the stoker and blower are controlled by the damper motors associated with the various zones, so that only one thermostat per zone is necessary. The unit M', however, is adapted for an installation where the stoker and blower are independent of the damper motor, as well as for one in which the stoker and blower are damper motor controlled. In the former type of installation, each zone has two thermostats, one to control the damper in a separate thermostat-damper motor circuit (not shown) and the other to control the stoker and blower independently of said circuit and through said unit M', employing said additional post 185 and said switch 187. In such case the contact 176' of each zone thermostat is connected to the post 185, the contact 177' to the post 81, and the thermostat blade 179' to the post 72, and the switch blade 190, which preferably is of the manual type, is connected in the summer with the contact 191 and hence with the thermostat blade 179', and in the winter with the contact 192 and hence with the thermostat contact 177'.

Now, when the temperature of a zone is too great the thermostat blade 179' engages the contact 176', and when heat is demanded the blade engages the contact 177'. In the winter, the contact 176' is disconnected from and the contact 177' is connected to the relay coil 66, so that the coil is energized only when the blade engages the contact 177', to operate the stoker and blower, subject to the conditions noted above relative to clock and limit control operation. In the summer, the stoker is inoperative, so that the coil 66 is employed to operate the blower, the contact 176' being connected to and the contact 177' being disconnected from the relay coil, so that the coil is energized only when cooling is demanded. As in the case of the damper motor controlled installation, it will be observed that the stoker and blower controlling thermostats in the various zones are all connected in parallel so that as long as there is a demand for heat in the winter or cooling in the summer, whether from only one or from more than one zone, the apparatus will function to supply such demand, the damper thermostat in each such demanding zone operating to open the associated damper to conduct the blown air into such zone.

When the unit M' is used with damper control, the switch blade 190 will be at all times engaged with the contact 192 and the switches 76 connected to the posts 72 and 81, as shown in Fig. 2.

The clock-operated cam mechanism for opening and closing the stoker-controlling switch 92 is operated at intervals which preferably may be varied as to number and duration. For example, in mild winter weather it naturally will not be necessary to run the stoker as often or for as long periods as in colder weather. In the illustrated embodiment of my invention, I have shown by way of example a cam mechanism which, in a given period such as one hour, may operate the stoker one, two or four times, for anywhere from about 15 seconds, more or less, to about seven minutes, more or less, each time. Thus the clock may operate the stoker throughout a range of from one 15 second period per hour to four seven minute periods per hour. It is to be understood that although in the ensuing description, reference is made specifically to the mechanism making possible the variations just mentioned, the same principles may be employed to provide for clock operation of the stoker any desired fractional or integral number of times including three or above four and for any desired duration above seven minutes each time, per hour or per any other desired period.

Although I have shown a specific type of heating plant, including a coal stoker, it will be apparent to those skilled in the art that my invention is applicable to other types employing different types of fuel, such as oil, gas, etc., and that, as stated above, the heat exchange medium may be other than hot air, for example steam or hot water. The medium could be for purposes other than heating or cooling, as for example humidification and fumigation, with or without the use of a heating apparatus.

The apparatus may include wall plugs (not shown) for expeditious connection to electrical outlet sockets leading to the line 54, which may afford 110 volts, 220 volts or any other voltage.

The invention obviously is applicable to one or more zones, regardless whether the zones comprise individual rooms or merely different parts of the same room, as in a large office, factory, assembly hall, theater, etc.

Various changes coming within the spirit of my invention may suggest themselves to those skilled in the art, and hence I do not wish to be limited to the specific embodiments shown or uses mentioned, except to the extent indicated in the appended claims, which are to be interpreted as broadly as the state of the art will permit.

I claim:

1. A system for controlling the temperature of a space, comprising a furnace, a fuel feed therefor, means for delivering a heat exchange medium from said furnace to the space, means for operating said feed and said delivering means to supply demands for the medium to the space, means for operating said feed to prevent dying of the fire and for rendering said delivering means inoperative at such time, means for discontinuing operation of said feed when the temperature of said furnace is excessive, and means for operating said delivering means notwithstanding such discontinuance and independently of the third mentioned means.

2. A system for controlling the temperature of a plurality of zones, comprising a furnace, a fuel feed therefor, means for delivering a heat exchange medium from said furnace to the individual zones, means for operating said feed and said delivering means to supply demands for the medium to each zone independently of the other or others, means for operating said feed and for rendering said delivering means inoperative to prevent dying of the fire, means for discontinuing operation of said feed when the temperature of said furnace is excessive, and means for operating said delivering means notwithstanding such discontinuance.

ARTHUR V. SAMPSEL.